United States Patent Office 3,590,014
Patented June 29, 1971

3,590,014
FLAME RETARDANT FOAMED AND FOAMABLE POLYMER COMPOSITIONS
Patrick Vivian Burt, Newport, England, assignor to Monsanto Chemicals Limited, London, England
No Drawing. Filed Nov. 21, 1968, Ser. No. 777,894
Claims priority, application Great Britain, Dec. 1, 1967, 54,732/67
Int. Cl. C08f 47/10, 45/58, 29/02
U.S. Cl. 260—2.5B
10 Claims

ABSTRACT OF THE DISCLOSURE

Foamable polymers suitable for the production of flame-retardant foamed resins by the prefoam/steam-molding technique comprise particles of a foamable thermoplastic resin coated with a mixture of a pentabromophenyl alkenyl ether and a tribromophenyl alkenyl ether.

BACKGROUND OF THE INVENTION

Field of the invention

This invention relates to foamed and foamable polymers. More particularly, the invention relates to foamable thermoplastic resin particles suitable for the production of flame-retardant foamed resins by the prefoam/steam-molding technique and to the flame-retardant foamed resins produced therefrom.

Description of the prior art

Foamable thermoplastic materials, e.g., polystyrene particles containing a volatile blowing agent, are an important industrial commodity and are commonly used in the production of foamed resins by the prefoam/steam-molding technique. In this well-established practice, the particles are expanded by the action of heat so as to produce a "prefoam" of foamed beads which are subsequently heated by steam in a suitable mold, where further expansion and consolidation of the foamed beads takes place and an article conforming to the shape of the mold is produced.

Since it is often desirable that the foamed products should possess some degree of flame-retardancy, e.g., when they are to be used in buildings, it has been proposed to add a flame-retardant agent to the foamable particles in order to impart flame-retardant properties. However, many compounds that would otherwise be good flame-retardant agents have a deleterious effect on the mechanical properties of the foamed product. For example, it has been found difficult to produce a satisfactory flame-retardant foamed polystyrene containing a halogen-containing flame-retardant agent, because the mechanical properties of the polystyrene tend to be adversely affected. Moreover, other compounds that would otherwise be good flame-retardant agents have a deleterious effect on the processability of the foamable particles. For example, some flame-retardant agents tend to shed in the prefoamer or to create prefoam-sticking problems, sometimes causing the prefoamer to block completely.

SUMMARY OF THE INVENTION

An object of this invention is to provide novel foamable thermoplastic resin particles containing a flame-retardant agent.

Another object is to provide foamable thermoplastic resin particles suitable for the production of flame-retardant foamed resins by the prefoam/steam-molding technique.

A further object is to provide novel flame-retardant foamed thermoplastic resins having excellent mechanical properties.

These and other objects are attained by (1) coating particles of a foamable thermoplastic resin, i.e., particles comprising a thermoplastic resin and a volatile blowing agent, with 0.3–3%, based on the weight of the particles, of a mixture of a pentabromophenyl alkenyl ether and a tribromophenyl alkenyl ether as a flame-retardant agent, at least 5% by weight of the mixture being the tribromophenyl alkenyl ether, and (2) foaming the coated particles by conventional prefoam/steam-molding techniques.

The flame-retardant agent of the invention does not appreciably shed in the prefoamer, and the coated particles can be prefoamed without encountering prefoam-sticking problems which could cause the apparatus to jam. Moreover, the flame-retardant agent imparts an excellent degree of flame-retardancy to the foamed product without deleteriously affecting the other physical properties. For example, there is no discoloration, and the normal range of densities can be obtained.

DESCRIPTION OF THE PREFERRED EMBODIMENTS

The following examples are given to illustrate the invention and are not intended as a limitation thereof. Unless otherwise specified, quantities mentioned are quantities by weight.

EXAMPLE I

Part A

Tumble 5000 parts of foamable polystyrene beads containing a pentane blowing agent and having a particle size of 12–22 B.S.S. mesh in a double conical blender with 2.5 parts of anhydrous calcium chloride for two minutes. Then add 47.5 parts of a blend produced independently by tumbling together for ten minutes 9.375 parts of 2,4,6-tribromophenyl allyl ether, 28.125 parts of pentabromophenyl allyl ether, 7.5 parts of ethylene-bis-stearamide, and 2.5 parts of sodium lauryl sulfate, and again tumble the mixture of beads and additives in the blender for three minutes. Add a solution of 5 parts of sorbitan monopalmitate in a mixture of 3.75 parts of hexane and 3.75 parts of methylated spirit, and again tumble the beads for three minutes. The product consists of foamable polystyrene beads having a well-adhered and even coating comprising the mixture of ethers and other additives.

Treat the coated beads with steam in a continuous prefoaming apparatus for two hours. During prefoaming, the coated beads show no tendency to form lumps that could cause the apparatus to jam. At the end of the two hours, the apparatus is virtually free of any accumulation of coating additives.

Allow the foamed beads to dry on an open tray for one day, and then use them to mold a foamed polystyrene block having a density of one pound per cubic foot by placing them in a mold and injecting steam through small holes in the mold walls. The block of foamed polystyrene is pure white, has excellent mechanical properties, and is free from distortion.

Test the foamed product for flame-retardant properties by British Standard 3837 (1965), using six sample strips 8 inches x 1 inch x 0.5 inch cut from the molded block. The resulting Flame Test Rating is 6 out of 6 self-extinguishing.

Test the foamed product for flame-retardant properties by the more rigorous modified ASTM D1692–59T test known as Plastics Test Method No. 117/2, using ten sample strips 6 inches x 2 inches x 0.5 inch. The resulting Flame Test Rating is 10 out of 10 non-burning, which is evidence of an excellent degree of flame-retardancy.

Test the foamed product for flame-retardant properties by the alcohol cup test known as Monsanto test method 118/2 and described in British Plastics, May 1965, pages 3–7 (a modified version of British Standard 2782, Part 5, 1958, Method 508D). Again the flame test rating is non-burning.

Cut the foamed block into tiles by means of an electrically-heated wire. The cut surface is aesthetically very pleasing, with the interfaces between foamed beads appearing as raised peripheries uniformly present over the whole surface.

Part B—Control

Repeat Part A except for using 0.75% of pentabromophenyl allyl ether instead of 0.75% of a 3:1 mixture of pentabromophenyl allyl ether and 2,4,6-tribromophenyl allyl ether as the flame-retardant agent. Appreciable quantities of the additive accumulate in the prefoaming apparatus, and the flame-retardant properties of the foamed product are inferior to those of the product of Part A.

Part C—Control

Repeat Part A except for using 0.75% of 2,4,6-tribromophenyl allyl ether instead of 0.75% of a 3:1 mixture of pentabromophenyl allyl ether and 2,4,6-tribromophenyl allyl ether as the flame-retardant agent. During prefoaming, the coated beads stick together and block the prefoamer completely.

EXAMPLE II

Tumble 5000 parts of foamable polystyrene beads containing a pentane blowing agent and having a particle size of 22–30 B.S.S. mesh for four minutes in a double conical blender with 47.5 parts of the blend of bromophenyl allyl ethers, ethylene-bis-stearamide, and sodium lauryl sulfate used in Example I—Part A. Then add a solution of 10 parts of sorbitan monopalmitate in a mixture of 15 parts of hexane and 15 parts of methylated spirit, and continue tumbling for a further three minutes. The product consists of foamable polystyrene beads having a firmly-adhered coating comprising the mixture of ethers and other additives.

Treat the coated beads with steam in a continuous prefoaming apparatus for one hour. There is no lumping of the coated beads, and the coating remains firmly adhered to the beads.

Allow the foamed beads to dry for one day on an open tray, and then use them to mold a foamed polystyrene insert suitable for use in packaging a phonograph record changer. The foamed product has excellent mechanical properties, a Flame Test Rating of 6 out of 6 self-extinguishing as determined by British Standard 3837 (1965), and a Flame Test Rating of 10 out of 10 non-burning as determined by Plastics Test Method No. 117/2.

The thermoplastic resin employed in the practice of the invention can be any such resin which can advantageously be given a degree of flame-retardancy in foamed form. Ordinarily the resin is a polymer of one or more ethylenically-unsaturated monomers, e.g., a hydrocarbon monomer such as ethylene, propylene, butylene, styrene, alpha-methylstyrene, o-, m-, or p-methylstyrene, other ar-alkylstyrenes, etc., or other suitable monomers such as methyl acrylate, ethyl acrylate, propyl acrylate, butyl acrylate, the corresponding alkyl methacrylates, vinyl acetate and other vinyl esters, etc. Such polymers include interpolymers of one or more of the above monomers with minor amounts, e.g., up to about 20% by weight, of other monomers such as acrylonitrile, butadiene, isoprene, etc., as well as mixtures of two or more of such polymers. The invention is particularly applicable to polystyrene resins, such as polystyrene itself or a toughened polystyrene, i.e., a polystyrene having physically or chemically combined therewith a minor proportion, e.g., 1–15% by weight, of a natural or synthetic rubber, e.g., substantially linear or branched polymers of conjugated dienes, such as butadiene, isoprene, etc., including copolymers thereof with lesser amounts of comonomers such as styrene, acrylonitrile, methyl methacrylate, etc.

The particles of foamable resin can be, e.g., beads that result directly from an appropriate suspension polymerization process or beads or granules that result from "steeping" with a volatile blowing agent. Foamable polystyrene beads, for instance, can be treated effectively.

In general, the blowing agent is a substance that volatilizes on heating, such as a low boiling liquid. In some instances, a volatile blowing agent is one that is in the form of a vapor at atmospheric pressure and ordinary temperatures, such as 20° C., but it is preferably a volatile liquid, normally one that swells but does not dissolve the polymer. Exemplary of volatile substances that can be used are lower aliphatic hydrocarbons such as a butane, a pentane, a hexane, cyclopentane, cyclohexane, etc.; lower alkyl halides such as methyl chloride, trichloromethane, 1,2-dichlorotetrafluoroethane, etc.; and mixtures of these substances. The lower aliphatic hydrocarbons, especially the pentanes, are preferred, and in practice a petroleum fraction consisting predominantly of pentanes can be usefully employed. The blowing agent is usually employed in a proportion of 2–15%, especially 3–10%, based on the weight of the foamable material. For example, the use of about 6% by weight of a pentane fraction in conjunction with polystyrene gives excellent results.

In the bromophenyl alkenyl ethers that are the flame-retardant agent of the invention, the alkenyl radical is normally a lower alkenyl radical, i.e., one containing not more than five carbon atoms, usually three or four carbon atoms, e.g., an allyl or methallyl radical. Preferably it is an allyl radical. The tribromophenyl group in the tribromo compound can be any of the possible isomers or a mixture of them, but it is preferable for the 2,4,6-tribromoisomer to predominate over any other isomers present. Moreover, a lower alkyl group, such as a methyl group, or a chlorine atom can optionally be present in the aromatic ring, so it is possible for the tribromo compound to be, e.g., tribromocresyl allyl ether. However, it is generally desirable for the tribromophenyl alkenyl ether to be a solid having a melting point of, e.g., 50–100° C. Tribromocresyl allyl ether is normally a liquid product and accordingly is less preferred than 2,4,6-tribromophenyl allyl ether, which melts at about 75° C. The mixture of ethers contains at least 5%, preferably 15–50%, e.g., about 25%, by weight of the tribromophenyl alkenyl ether.

The quantity of the flame-retardant agent employed (i.e., the combined weights of the bromophenyl alkenyl ethers) depends on several factors, including, e.g., the degree of flame-retardancy that it is desired to impart to the final foamed product, but in general it is preferably between about 0.5 and 3%, such as between 0.75 or 1 and 2.5%, based on the weight of the foamable resin particles.

In the process of the invention, the foamable resin particles are coated with the flame-retardant mixture of bromophenyl alkenyl ethers so that a thin layer of the flame-retardant agent is coated on the particles. For example, the mixture can be employed as a powder and applied to the foamable resin particles in this form. In many instances, it is preferred to use an adhesive such as a viscous liquid or a low-melting solid. The adhesive should be a substance which does not have an adverse effect on conversion of the particles to foamed resin, e.g., by causing the particles of prefoam to stick together in clusters and jam the prefoaming and subsequent handling apparatus, or by interfering with proper consolidation of the prefoam during the molding step so that the foamed resin lacks strength. Exemplary of suitable adhesive substances are oils such as a mineral oil, waxes such as a paraffin wax, and film-forming polymer latices such as a latex of a natural or synthetic rubber, polystyrene, or a styrene-butadiene copolymer resin. The preferred adhesive substances are those that also have the property of inhibiting cluster formation at the prefoaming stage. Exemplary of such adhesives are (1) the sorbitol or sorbitan esters, e.g., the monolaurate, monopalmitate, monostearate, and trioleate, which are described in U.S. application Ser. No. 580,603, filed Sept. 20, 1966, in the names of Brinley Roberts and Robert James Stephenson and (2) the amides of $C_{12}$ to $C_{20}$ fatty acids, such as those described in U.S. application Ser. No. 736,567, filed June 13, 1968, in the name of Charles Robert Heald. A particularly useful ester adhesive is sorbitan monopalmitate; and, oleamide, and ricinoleamide are preferred amide adhesives.

When an adhesive is used, it can be applied together with a deliquescent substance. However, when a deliquescent substance is also used, the adhesive is preferably applied after the deliquescent substance. When the adhesive substance is a viscous liquid, its application to the particles is assisted if its viscosity is reduced to, e.g., less than 500 centipoises at 25° C. by mixing it with a small amount of an appropriate organic liquid, e.g., an alcohol such as methanol, ethanol, isopropanol, etc., or a hydrocarbon such as pentane, hexane, etc. For example, when the blowing agent is a volatile liquid, some of it can be used for this purpose. A mixture of solvents can be employed.

When the flame-retardant mixture is used in a liquid composition such as a solution or dispersion (which may or may not contain an adhesive), the composition can be aqueous or nonaqueous and can be applied, e.g., by spraying, rolling, or brushing. However, in a preferred method, the powdered mixture is dusted on the particles, e.g., by tumbling the components together in a drum, and an adhesive is then applied, preferably in solution in a solvent. (The order of these treatments can be reversed.) After the treatment, any residual solvent can be allowed to evaporate, if desired in a current of air. In general, the amount of adhesive substance employed is about 5.0–25%, preferably 7.5–15.0%, based on the weight of the flame-retardant agent.

In addition to the flame-retardant agent and any adhesive, other components can be present in the coating if desired. Exemplary of such components are pigments, dyes, agents designed to shorten the time required for the molded foamed resin to cool (e.g., a wax, or the petroleum fraction known as white spirit as described in British Pat. 1,083,040), or a deliquescent substance such as calcium chloride which has the property of improving the appearance of the final foamed product when cut with a hot wire, as described in U.S. application Ser. No. 686,734, filed Nov. 29, 1967, in the name of Patrick Vivian Burt.

Foaming and molding operations performed on the foamable thermoplastic material can follow ordinary practice. Thus, for example, the foamable particles can be heated by steam, hot water, or air, or under the influence of an infra-red heater, to produce prefoamed beads, which are preferably conditioned by exposing them to the atmosphere for a day or two before they are used in the molding operation. A suitable mold can then be partially or fully filled with the prefoamed beads and closed, and steam is injected through inlets in the mold walls. When foaming is complete, the steam supply is shut off, and the resulting flame-retardant shaped product is allowed to cool before the mold is opened. Other methods of molding can also be employed.

When foamed, the product has very good self-extinguishing properties and normally has approximately the same content of flame-retardant agent as the total quantity associated with the foamable particles. In many instances, improved results are obtained when a relatively high-purity grade of flame-retardant agent is employed.

It is obvious that many variations can be made in the products and processes set forth above without departing from the spirit and scope of this invention.

What is claimed is:

1. Foamable thermoplastic resin particles having a coating comprising 0.3–3%, based on the weight of the particles, of a mixture of a pentabromophenyl alkenyl ether and a tribromophenyl alkenyl ether as a flame-retardant agent, at least 5% by weight of the mixture being the tribromophenyl alkenyl ether.

2. The particles of claim 1 wherein the thermoplastic resin is a polymer of an ethylenically-unsaturated hydrocarbon monomer.

3. The particles of claim 2 wherein the thermoplastic resin is polystyrene.

4. The particles of claim 1 wherein the mixture of bromophenyl alkenyl ethers contains 15–50% by weight of the tribromophenyl alkenyl ether.

5. The particles of claim 4 wherein the mixture of bromophenyl alkenyl ethers contains about 25% by weight of the tribromophenyl alkenyl ether.

6. The particles of claim 1 wherein the alkenyl radical in each of the bromophenyl alkenyl ethers is an allyl radical.

7. The particles of claim 6 wherein the ethers are, respectively, pentabromophenyl allyl ether and 2,4,6-tribromophenyl allyl ether.

8. The particles of claim 1 wherein the coating comprises an adhesive substance.

9. In a process for producing a foamed thermoplastic resin article by (1) heating foamable thermoplastic resin particles to form a prefoam of foamed particles, (2) treating the prefoam with steam in a mold to form a shaped article, and (3) allowing the shaped article to cool before removing it from the mold, the improvement which comprises employing foamable thermoplastic resin particles having a coating comprising 0.3–3%, based on the weight of the particles, of a mixture of a pentabromophenyl alkenyl ether and a tribromophenyl alkenyl ether as a flame-retardant agent, at least 5% by weight of the mixture being the tribromophenyl alkenyl ether.

10. The process of claim 9 wherein the thermoplastic resin is polystyrene, the pentabromophenyl alkenyl ether is pentabromophenyl allyl ether, the tribromophenyl alkenyl ether is 2,4,6-tribromophenyl allyl ether, and the mixture of bromophenyl allyl ether contains about 25% by weight of the tribromophenyl allyl ether.

References Cited

UNITED STATES PATENTS 3,271,333 9/1966 Eichhorn _____ 260—2.5(FP)
3,372,141 3/1968 Dickerson et al. ____ 260—45.95

MURRAY TILLMAN, Primary Examiner

W. J. BRIGGS, Sr., Assistant Examiner

U.S. Cl. X.R.

260—33.6PQ, 33.6UA, 45.95, 93.5A